United States Patent
Malone et al.

(10) Patent No.: US 6,508,653 B2
(45) Date of Patent: *Jan. 21, 2003

(54) COMPUTER SYSTEM BULKHEAD PLATE FOR ATTENUATING ELECTROMAGNETIC INTERFERENCE (EMI) AT A TELEPHONE JACK CONNECTOR

(75) Inventors: Christopher G. Malone, Folsom, CA (US); Glenn C. Simon, Auburn, CA (US)

(73) Assignee: Hewlett-Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/675,369

(22) Filed: Sep. 29, 2000

(65) Prior Publication Data
US 2002/0068471 A1 Jun. 6, 2002

(51) Int. Cl.[7] ................................ H01R 4/66
(52) U.S. Cl. .................... 439/92; 439/607; 439/939
(58) Field of Search ........................ 439/609, 607, 439/939, 92, 248, 544, 557, 549, 567

(56) References Cited

U.S. PATENT DOCUMENTS

| | | | |
|---|---|---|---|
| 4,214,292 A | 7/1980 | Johnson | 361/721 |
| 4,328,898 A | 5/1982 | Grassi | 211/41.17 |
| 4,386,814 A * | 6/1983 | Asick | 339/14 R |
| 5,398,822 A | 3/1995 | McCarthy et al. | 211/41.17 |
| 5,599,206 A * | 2/1997 | Slack et al. | 439/536 |
| 5,638,259 A | 6/1997 | McCarthy et al. | 361/800 |
| 5,650,922 A | 7/1997 | Ho | 361/799 |
| 5,770,822 A | 6/1998 | Abolitz et al. | 361/800 |
| 5,772,471 A * | 6/1998 | Buck | 439/607 |
| 5,838,550 A * | 11/1998 | Morris et al. | 361/818 |
| 5,929,376 A | 7/1999 | Doun et al. | 174/35 R |
| 5,957,465 A | 9/1999 | Gonsalves et al. | 277/637 |
| 5,975,953 A * | 11/1999 | Peterson | 439/607 |
| 6,018,464 A | 1/2000 | Kim | 361/818 |
| 6,066,001 A * | 5/2000 | Liptak et al. | 439/607 |
| 6,201,711 B1 * | 3/2001 | Cherniski et al. | 361/800 |
| 6,231,384 B1 * | 5/2001 | Kuo | 439/545 |

OTHER PUBLICATIONS

"New! Card Cage Shielding," advertisement in Compliance Engineering: The Magazine for International Regulatory Compliance, 1998 Annual Reference Guide, vol. XV, No. 3, p. A70, (1998).

* cited by examiner

Primary Examiner—Gary Paumen
Assistant Examiner—Ann McCamey

(57) ABSTRACT

A bulkhead plate member for providing an attenuating barrier for electromagnetic interference (EMI) noise in a computer system housing. The bulkhead plate member includes a rectangular shaped main portion having a material thickness. The main portion has a plurality of edge walls defining an opening for receiving a peripheral component connector affixed to a printed circuit board (PCB). The edge walls are adapted to contact side walls of the peripheral component connector to provide contact regions substantially perpendicular to the main portion and greater than the material thickness of the main portion, such that EMI noise is conducted through the bulkhead plate member, at the edge walls of the opening, to a bulkhead wall of the computer system housing thereby suppressing the EMI noise. The edge walls of the opening provides increased surface area contact between the bulkhead plate member and the peripheral component connector to maximize the attenuation of EMI noise around the connector.

27 Claims, 7 Drawing Sheets

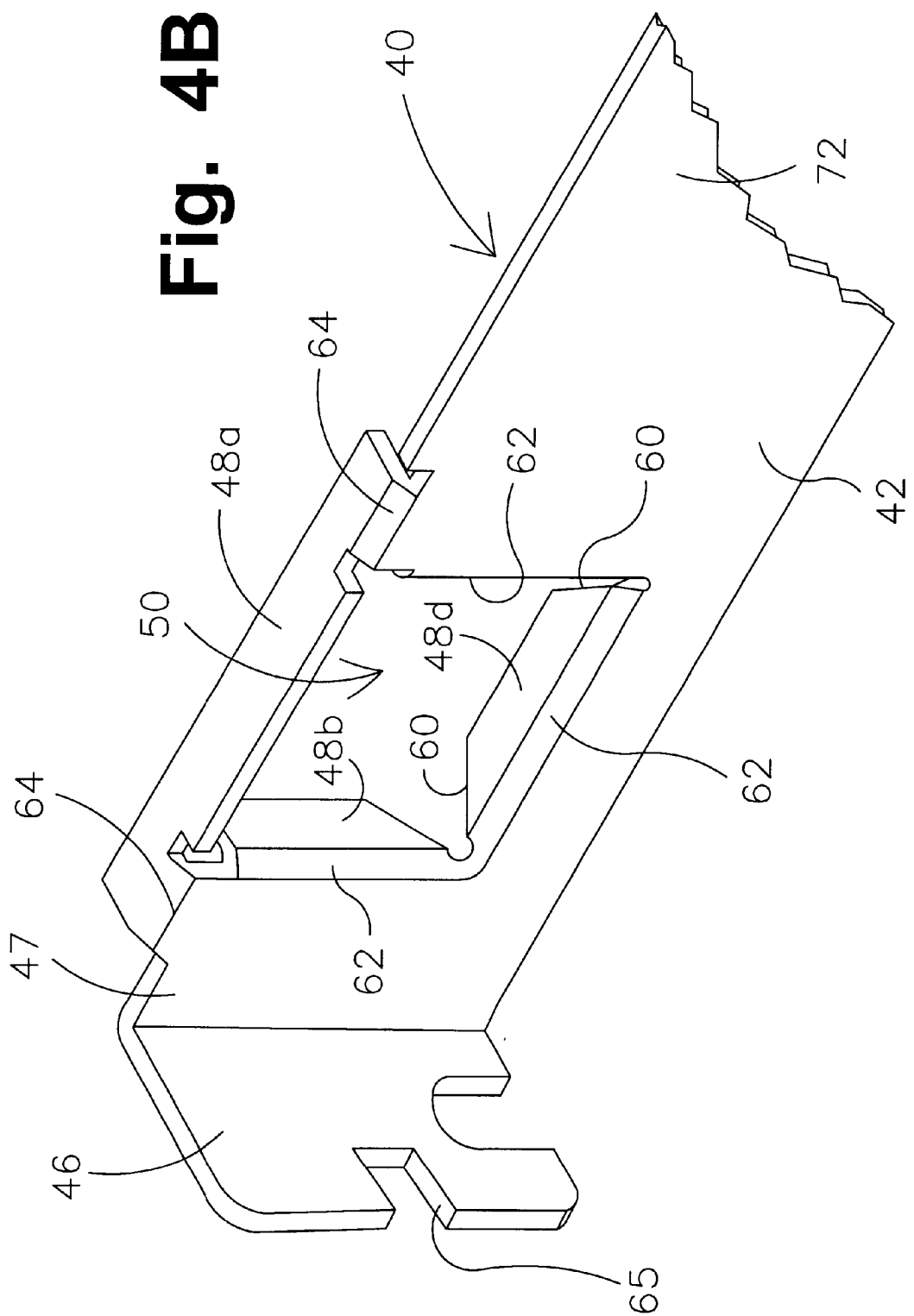

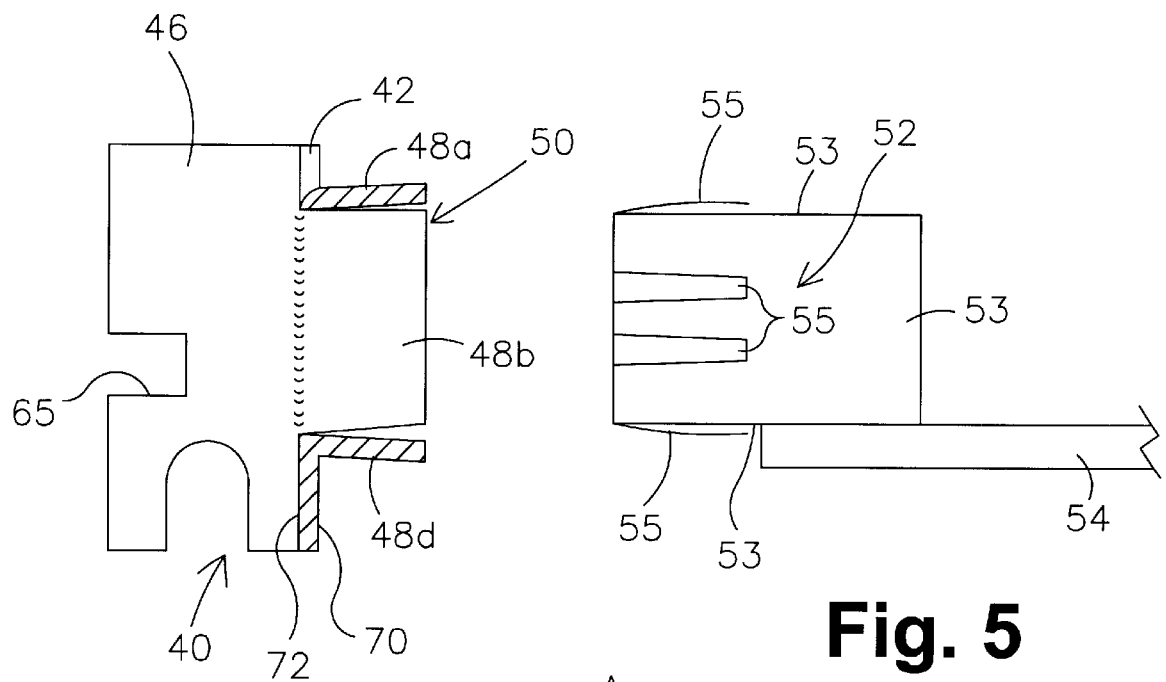
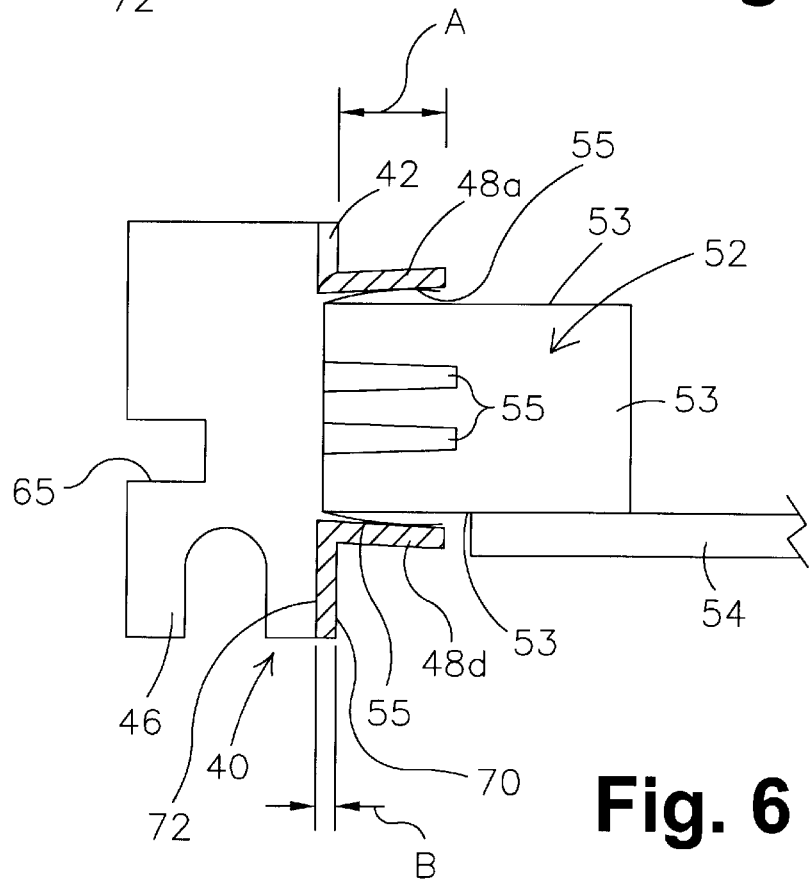

COMPUTER SYSTEM BULKHEAD PLATE FOR ATTENUATING ELECTROMAGNETIC INTERFERENCE (EMI) AT A TELEPHONE JACK CONNECTOR

TECHNICAL FIELD

This invention relates generally to suppressing electromagnetic interference (EMI) within a computer system. In particular, the present invention is an EMI suppressing bulkhead plate member for a peripheral component interconnect (PCI) computer system housing. The bulkhead plate member provides EMI containment at a telephone jack connector affixed to a printed circuit board (PCB) mounted within the PCI computer system housing.

BACKGROUND OF THE INVENTION

As computer system frequencies and power increase, the electromagnetic energy or noise, also known as electromagnetic interference (EMI), radiating from the computer system housing increases proportionally. This EMI noise typically originates from the different components within the computer system, and can interfere with the operation of other pieces of electronic equipment associated with the computer system or in close proximity thereto. As such, computer systems typically need to comply to an electromagnetic compliance (EMC) standard which defines limits to levels of stray EMI noise. To comply with EMC standards and to protect electronic equipment from operation affecting EMI noise, the computer system components that emit EMI noise are generally placed within a shielded enclosure, such as a computer system housing. The computer system housing suppresses EMI noise emanating from computer system components by containing or otherwise diminishing stray EMI noise signals.

One type of computer system housing that attenuates EMI noise employs a PCB input/output (I/O) connection system known as the peripheral component interconnect (PCI) system. The popularity of the PCI system has grown to a point where it is the preferred I/O connection system for larger server computers as well as workstation computers. The PCI system allows one or more microprocessors (i.e., PCB's) to be interconnected with attached external devices.

The PCI system includes a computer system housing defined by a plurality of walls. At least one of these walls is removable to provide access to an interior region of the housing to allow PCB's to be inserted into and removed from the housing. The PCB's are releasably connectable to a central processing unit of the computer system through a mother board, often referred to as a backplane board, as it is vertically mounted as a back wall of the computer system housing.

A wall of the computer system housing adjacent to the backplane board includes a plurality of PCI slots (i.e., between six and twelve total) which are disposed in the computer system housing to provide external access to the PCB's mounted within the housing. Peripheral component connectors on the PCB's extend through these PCI slots so that compatible external devices can be plugged into the PCB's via the peripheral component connectors. On type of peripheral component connector typically used in computer system housings is a telephone jack connector often referred to as a RJ-45 connector.

The wall of the computer system housing that includes the PCI slots is often referred to as the bulkhead wall of the computer system housing. In the PCI system, that portion of a PCB that includes the peripheral component connector also includes a bulkhead plate member that covers the portion of the respective PCI slot not taken up by the peripheral component connector. In addition, in the PCI system, those PCI slots not currently accommodating a PCB are covered by individual blank bulkhead plate members that are substantially identical to the PCB bulkhead plate members and function to cover the unused PCI slots. The PCB and blank bulkhead plate members are typically secured to the housing, and in particular, to the bulkhead wall via a separate screw fastener.

The walls of the PCI computer system housing generally provide some suppression of the EMI noise produced by the PCB's mounted within the housing. However, EMI noise from the PCB's does radiate from the PCI slots and the peripheral component connectors (e.g., RJ-45 connectors) to such an extent that a typical PCI computer system housing does not meet EMC standards. To provide conduction paths to the computer system housing for EMI noise currents to meet EMC standards, bulkhead gaskets are used.

In the typical PCI system, the bulkhead gasket is placed on the interior surface of the bulkhead wall. The bulkhead gasket makes contact with the bulkhead wall and with the bulkhead plate members along the two longest sides of the bulkhead plate members. Typically, the bulkhead gasket is a thin (0.004") stainless steel metal stamping containing a line of formed spring tabs as contact points between the bulkhead wall and the bulkhead plate members. The peripheral component connectors typically extend through oversized openings within the bulkhead plate members. In the case of RJ-45 peripheral component connectors, these connectors typically include spring fingers that make contact with edges of the oversized openings in the bulkhead plate members to provide EMI noise containment.

FIG. 1 generally illustrates a partial sectional view of a prior art bulkhead plate member 100 and a RJ-45 peripheral component connector 102 mounted to a PCB 104 as referred to above. The bulkhead plate member 100 includes a main portion 106 defining an oversized opening 108 sized to allow the RJ-45 connector 102 to extend therethrough. The bulkhead plate member 100 further includes a mounting tab 110 that extends at a 90° angle with respect to the main portion 106. The mounting tab 110 includes a slot 112 for receipt of a fastener (not shown) for mounting the bulkhead plate member 100 to a PCI computer system housing (not shown). As can be seen in FIG. 1, side walls 114 (only three of which can be seen) of the RJ-45 connector 102 include EMI spring fingers 116. Each side wall 114 includes a pair of EMI spring fingers 116 which contact edges 118 of the oversized opening 108.

Because the bulkhead plate member 100 is very thin (i.e., 0.030") there is very little surface area contact between the EMI spring fingers 116 and the edges 118 of the oversized opening 108 in the bulkhead plate member 100. As a result, EMI noise containment around the RJ-45 connector is generally inadequate and may not comply with EMC standards. Without adequate contact between the bulkhead plate members and the EMI spring fingers of the RJ-45 connector, EMI noise will not be conducted to the computer system housing, and as such, the EMI noise will not be suppressed.

There is a need for an improved PCI computer system housing. In particular, there is a need for PCI bulkhead plate members that adequately suppresses EMI noise around peripheral component connectors, such as RJ-45 telephone jack connectors. The PCI bulkhead plate member should permit ample surface area contact between the bulkhead plate member and the EMI spring fingers on the RJ-45 connector to maximize the attenuation of EMI noise.

SUMMARY OF THE INVENTION

The present invention is a bulkhead plate member for providing an attenuating barrier for electromagnetic interference (EMI) noise in a computer system housing. The bulkhead plate member includes a rectangular shaped main portion having a material thickness. The main portion has a plurality of edge walls defining an opening for receiving a peripheral component connector affixed to a printed circuit board (PCB). The edge walls are adapted to contact side walls of the peripheral component connector to provide contact regions substantially perpendicular to the main portion and greater than the material thickness of the main portion, such that EMI noise is conducted through the bulkhead plate member, at the edge walls of the opening, to a bulkhead wall of the computer system housing thereby suppressing the EMI noise.

In one aspect of the present invention, the bulkhead plate member also includes a first mounting tab at a first end of the main portion, and a second mounting tab at a second opposite end of the main portion. The second mounting tab extends at substantially a 90° angle with respect to the main portion. In another aspect of the present invention, the edge walls of the opening in the main portion of the bulkhead plate member are flange elements that are integral with the main portion. These flange elements engage spring fingers on side walls of the peripheral component connector. In a further aspect of the present invention, the peripheral component connector is a RJ-45 telephone jack connector.

In another embodiment, the present invention provides a computer system housing for providing an attenuating barrier for electromagnetic interference (EMI) noise. The computer system housing includes a backplane wall having a plurality of connectors for receiving PCB's, and a bulkhead wall coupled to the backplane wall. The bulkhead wall defines a plurality of bulkhead slots through which connector receptacles of the PCB's can extend. The computer system housing also includes a plurality of bulkhead plate members. At least one of the bulkhead plate members includes a rectangular shaped main portion having a material thickness. The main portion has a plurality of edge walls defining an opening for receiving a peripheral component connector affixed to a printed circuit board (PCB). The edge walls are adapted to contact side walls of the peripheral component connector to provide contact regions substantially perpendicular to the main portion and greater than the material thickness of the main portion, such that EMI noise is conducted through the bulkhead plate member, at the edge walls of the opening, to a bulkhead wall of the computer system housing thereby suppressing the EMI noise.

In this bulkhead plate member and computer system housing of the present invention, the edge walls (i.e., flange elements) defining the opening in the main portion of the bulkhead plate member provide an increased amount of surface area contact between the bulkhead plate member and the spring fingers on the side walls of the RJ-45 telephone jack connector. This increased surface area contact substantially maximizes (when compared to prior art solutions) the attenuation of EMI noise around the RJ-45 connector.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principals of the invention. Other embodiments of the present invention and many of the intended advantages of the present invention will be readily appreciated as the same become better understood by reference to the following detailed description when considered in connection with the accompanying drawings, in which like reference numerals designate like parts throughout the figures thereof, and wherein:

FIG. 4B is a partial perspective view of a front side of the bulkhead plate member illustrating EMI flange elements in accordance with the present invention.

FIG. 5 is a partial sectional view showing the bulkhead plate member of FIG. 3 separated from the PCB having the RJ-45 telephone jack connector.

FIG. 6 is a partial sectional view similar to FIG. 5 showing the bulkhead plate member attached to the PCB having the RJ-45 telephone jack connector.

DETAILED DESCRIPTION OF THE PREFERRED EMBODIMENTS

Figure 2:
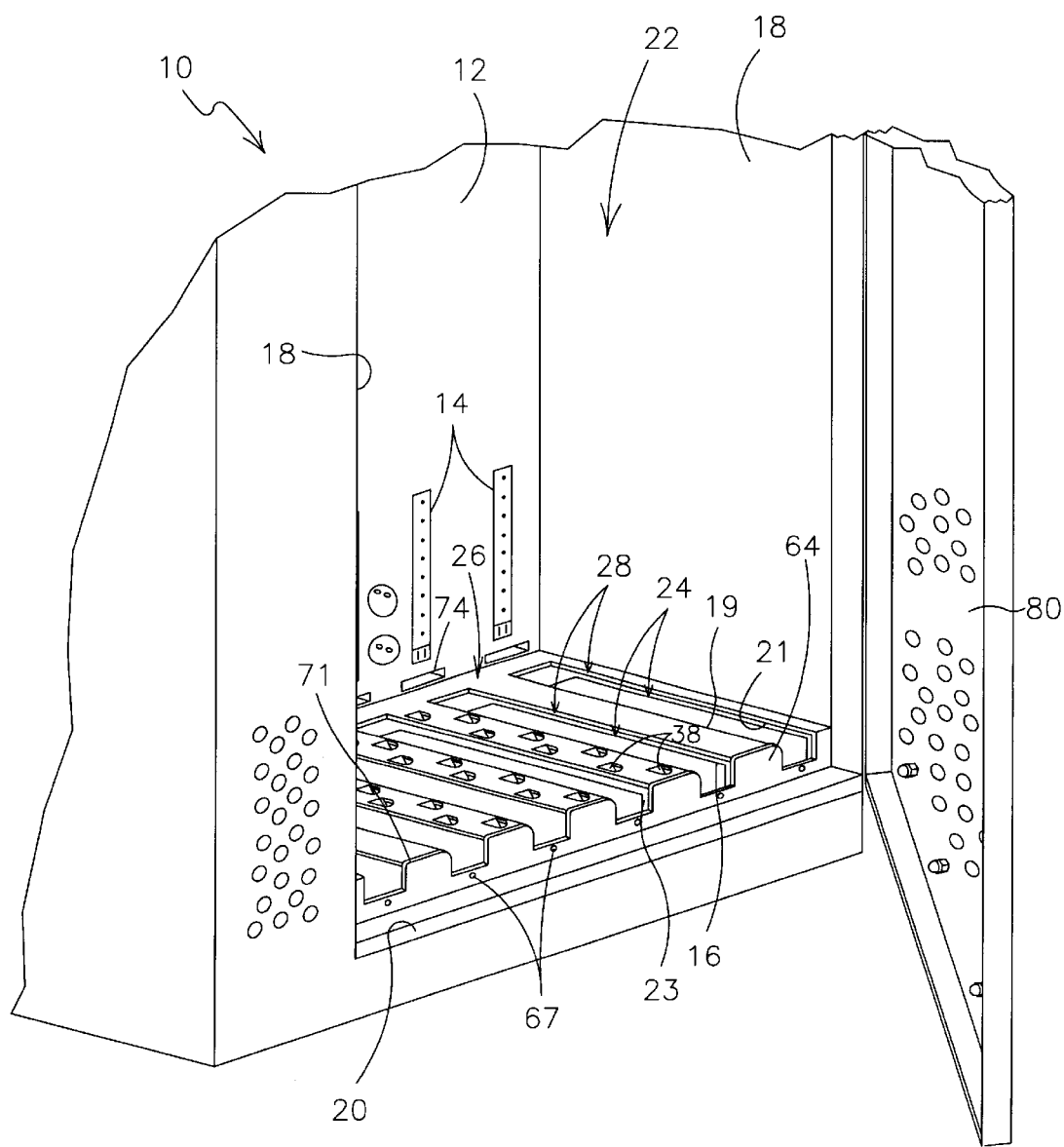
FIG. 2 is a front perspective view of PCI computer system housing for attenuating EMI in accordance with the present invention.
Figure 3:
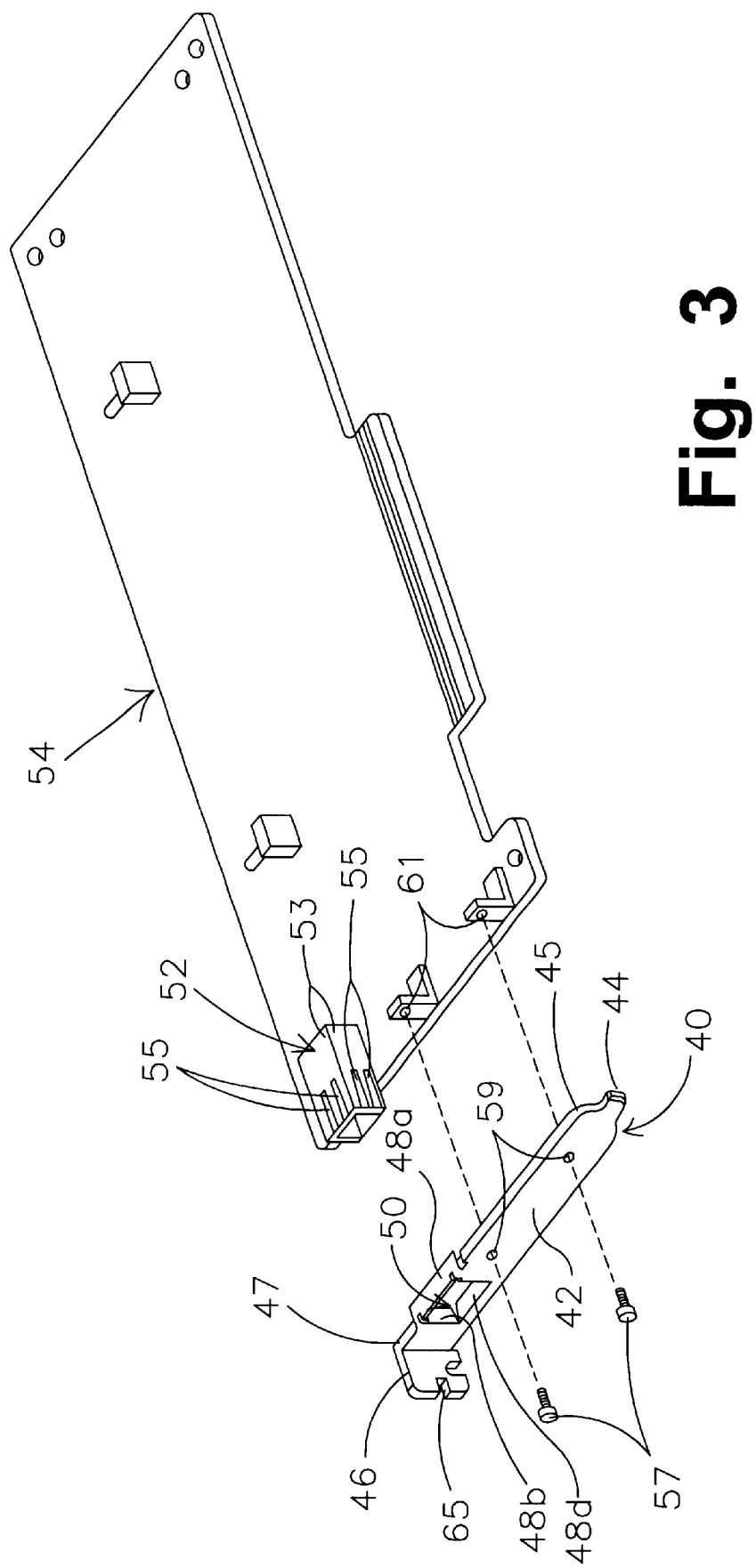
FIG. 3 is an exploded perspective view of a bulkhead plate member in accordance with the present invention, showing the bulkhead plate member in relation to a PCB having a RJ-45 telephone jack connector affixed thereto.
Figure 7:
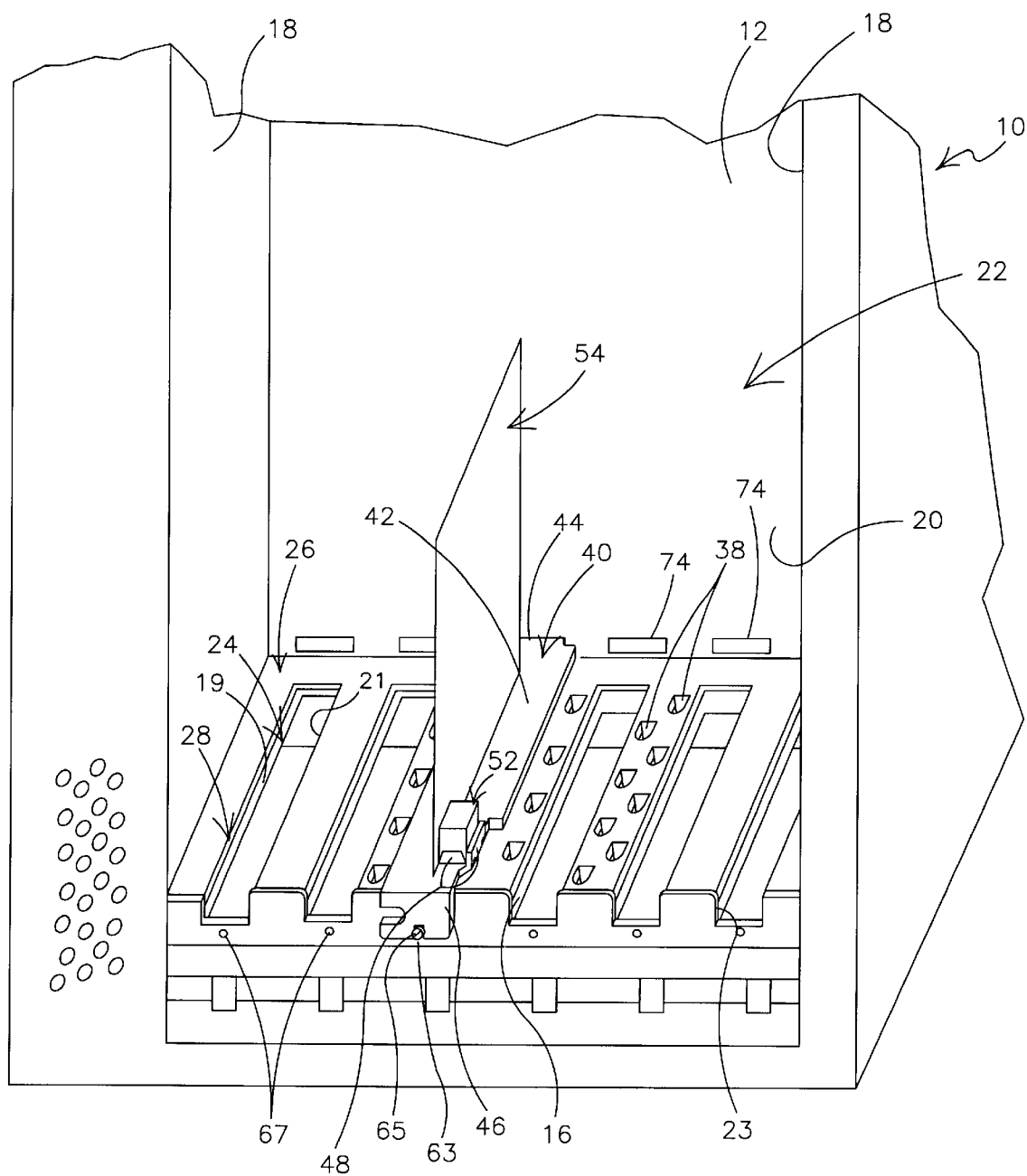
FIG. 7 is a front perspective view similar to FIG. 2 showing the bulkhead plate of FIG. 3 mounted within the computer system housing of FIG. 2 in accordance with the present invention.

A computer system housing 10 and a bulkhead plate member 40 in accordance with the present invention for providing an attenuating barrier for electromagnetic interference (EMI) noise in accordance with the present invention is generally illustrated in FIGS. 2, 3 and 7. The computer system housing 10 includes a motherboard or backplane wall 12 having a plurality of printed circuit board (PCB) connectors 14. A bulkhead wall 16 is coupled to the backplane wall 12 so as to be substantially perpendicular relative thereto. The computer system housing also includes a first, second and third side walls 18 (only two of which are shown in FIGS. 3 and 7) which are coupled to the backplane wall 12. The first and third side walls 18 are further coupled to the bulkhead wall 16. All connections between the side walls 18, the backplane wall 12 and the bulkhead wall 16 are substantially perpendicular. The backplane wall 12 together with the bulkhead wall 16 and the side walls 18 define an opening 20 into an interior region 22 of the computer system housing 10.

Figure 1:
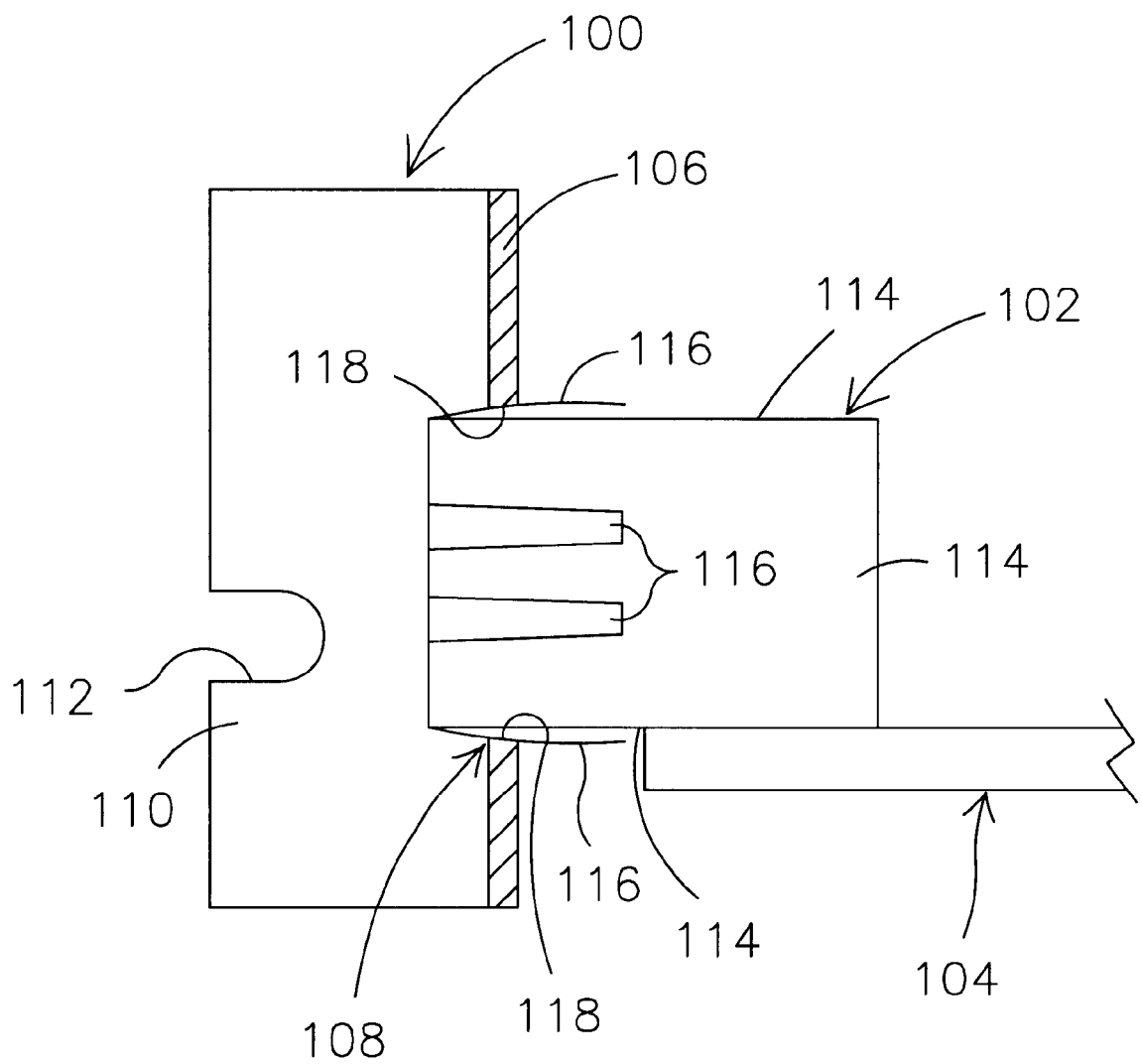
FIG. 1 is a partial sectional view of a prior art bulkhead plate member for attenuating EMI around a RJ-45 telephone jack connector affixed to a PCB.

As seen best in FIGS. 2 and 7, the bulkhead wall 16 includes a mounting flange 23 that extends substantially perpendicular to the main portion of the bulkhead wall 16. The bulkhead wall 16 further defines a plurality of bulkhead slots 24 that correspond to and are in alignment with the PCB connectors 14. Each of the bulkhead slots 24 includes a first side edge 19 and a second side edge 21 parallel thereto. Six bulkhead slots 24 are illustrated in FIG. 1, but the bulkhead wall 16 can include any number of bulkhead slots 24 depending upon the application to which the computer system housing 10 is to be used. An EMI bulkhead gasket 26, is positioned on an interior surface of the bulkhead wall 16. The EMI bulkhead gasket 26 defines a plurality of gasket slots 28 that correspond to and are in alignment with the bulkhead slots 24 of the bulkhead wall 16. The EMI bulkhead gasket 26 includes side edge spring tabs 38 that are bent out of the plane of the EMI bulkhead gasket 26. The side edge spring tabs 38 contact the bulkhead wall 16.

In the one preferred embodiment, the EMI bulkhead gasket 26 is defined by a gasket plate formed of a flat, flexible, electrically conducive material such as stainless steel which is 0.004" thick. The side edge spring tabs 38 are formed by a die cutting stamping machine that cuts the spring tabs and bends the spring tabs out of the plane of the gasket plate defining the EMI bulkhead gasket 26.

The computer system housing 10 is adapted to receive a plurality of readily removable bulkhead plate members with one bulkhead plate member being associated with each bulkhead slot 24. In particular, as seen in FIG. 7, the computer system housing 10 includes at least one bulkhead plate member 40 for providing an attenuating barrier for EMI noise in accordance with the present invention. As seen best in FIGS. 3, 4A and 4B, the bulkhead plate member 40 includes a rectangular shaped main portion 42, a first mounting tab 44 at a first end 45 of the main portion 42, and a second mounting tab 46 at a second opposite end 47 of the main portion 42. The second mounting tab 46 extends at substantially a 90° angle with respect to the main portion 42.

Figure 4A:
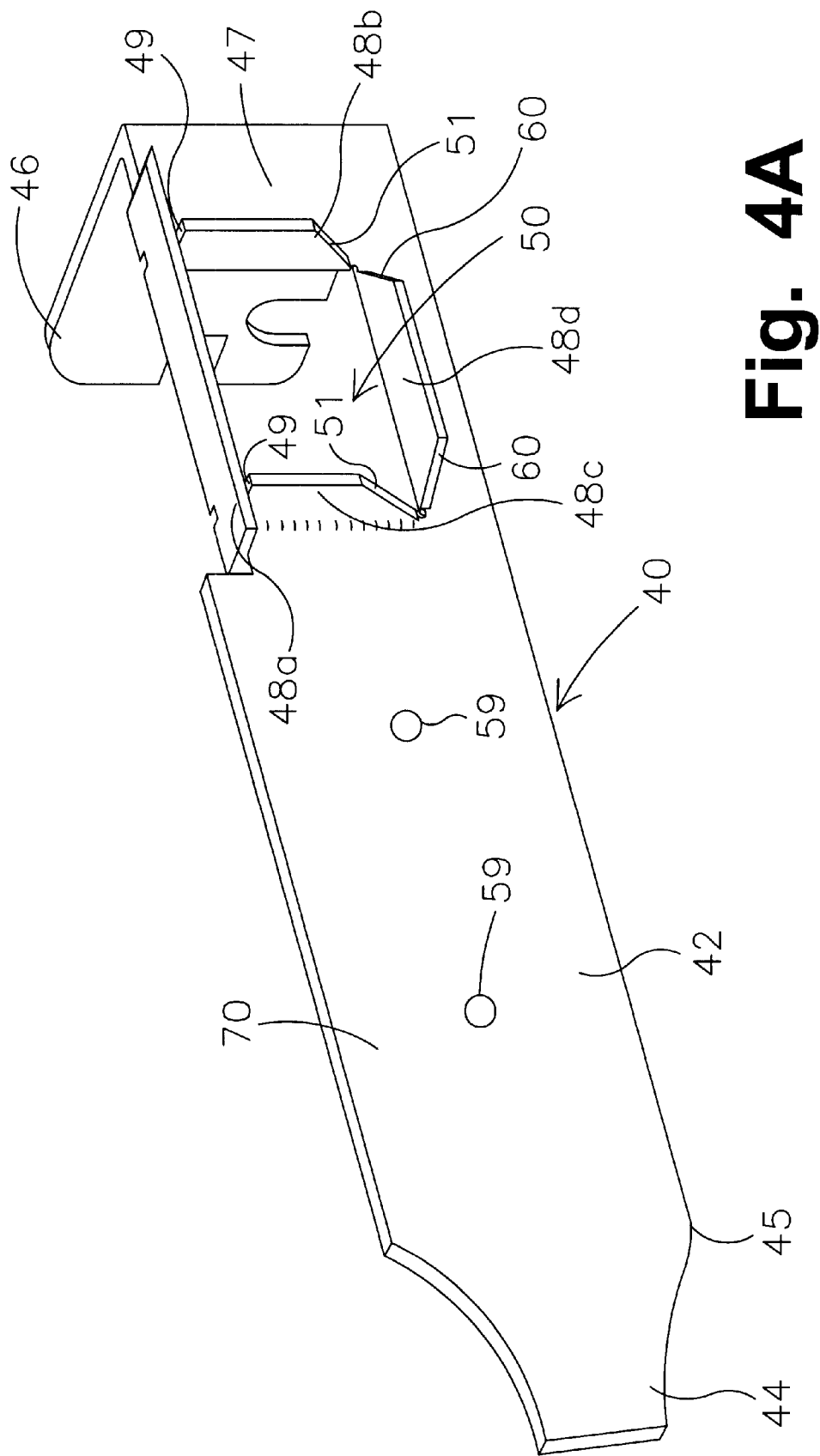
FIG. 4A is a perspective view of a rear side of the bulkhead plate member illustrating EMI flange elements in accordance with the present invention.

As seen in FIGS. 3, 4A and 4B, the main portion 42 of the bulkhead plate member 40 includes four edge walls defined by four trapezoid shaped flange elements 48a, 48b, 48c and 48d. In particular, the first flange element or top flange 48a is generally rectangular in shape. The second and third flange elements or side flanges 48b and 48c are substantially identical, with each side flange 48b, 48c including a perpendicular top edge wall 49 and an inwardly angled bottom edge wall 51 (see FIG. 4A). While the fourth flange element or bottom flange 48d includes a pair of inwardly angled edge walls 60 (see FIGS. 4A and 4B). Each of the flange elements 48a–d forms an angle with respect to the main portion 42 of the bulkhead plate member 40 that is less than 180°. In one preferred embodiment, each of the flange elements 48a–d forms substantially a 90° angle with respect to the main portion 42. The flange elements 48a–d extend from the main portion 42 of the bulkhead plate member 40 in a direction substantially opposite to the direction of extension of the second mounting tab 46. The flange elements 48a–d are integral with the main portion 42. In one preferred embodiment, the flange elements 48a–d are formed by first die cutting a single sheet metal piece that defines the main portion 42 of the bulkhead plate member 40 to define the shape of the flange elements 48a–d. Next, the flange elements 48a–d are folded (i.e., bent) out of the plane of the main portion 42 to their desired position best shown in FIGS. 4A and 4B. The flange elements 48b, 48c, 48d each have a single fold region 62, while the flange element 48a has a pair of spaced fold regions 64 (see FIG. 4B).

As seen in FIGS. 3–6, the flange elements 48a–d define an oversized opening 50 for receiving a peripheral component connector, such as a RJ-45 telephone jack connector 52 affixed to a PCB 54. As seen best in FIGS. 3, 5 and 6, the RJ-45 connector 52 includes four side walls 53 (only three of which can be seen in FIGS. 5 and 6). Each of the side walls 53 of the RJ-45 connector 52 includes a pair of EMI spring tabs or fingers 55. As seen in FIG. 6, with the bulkhead plate member 40 secured to the PCB 54, the RJ-45 connector 52 extends through the oversized opening 50 such that the flange elements 48a–d of the main portion 42 of the bulkhead plate member 40 engage the spring fingers 55 of the RJ-45 connector 52. As can be seen in FIG. 6, the interengagement of the flange elements 48a–d with the spring fingers 55 provides contact areas or regions "A" substantially perpendicular to the main portion 42 of the bulkhead plate member 40 and greater than the material thickness "B" of the main portion 42 such that EMI noise from the RJ-45 connector 52 is conducted through that bulkhead plate member 40 at the at the interface between the flange elements 48a–d and the spring fingers 55. These contact regions "A" provide an increased amount of surface area contact between the bulkhead plate member 40 and the spring fingers 55 of the RJ-45 connector 52 particularly when compared to the prior art solution illustrated in FIG. 1. As such, this increased surface area contact (represented by contact regions "A") substantially maximize the attenuation of EMI noise around the RJ-45 connector 52. Also as seen in FIG. 6, the main portion 42 of the bulkhead plate member 40 includes an inner surface 70 (see FIG. 4A) and an outer surface 72 (see FIG. 4B). The RJ-45 connector 52 extends through the oversized opening 50 from the inner surface 70 to the outer surface 72 such that the RJ-45 connector 52 does not extend past the outer surface 72 of the main portion 42 so as to substantially prevent damage to the RJ-45 connector 52. As seen best in FIG. 3, the bulkhead plate member 40 is secured to the PCB 54 via screw fasteners 57 that extend through holes 59 in the main portion 42 of the bulkhead plate member 40 and are threadably received within mounting brackets 61 secured to the PCB 54.

As seen best in FIG. 7, the bulkhead plate member 40 is releasably mountable within the computer system housing 10 at the bulkhead slots 24/gasket slots 28. When the bulkhead plate member 40 is positioned at the bulkhead slots 24/gasket slots 28, the main portion 42 of the bulkhead plate member 40 contacts the EMI bulkhead gasket 26. In addition, first mounting tab 44 of the bulkhead plate member 40 engages one of the mounting channels 74 formed in the backplane wall 12 immediately adjacent the bulkhead wall 16. One of the mounting channels 74 corresponds to and is in alignment with each of the bulkhead slots 24/gasket slots 28. The mounting channel 74 receives the first mounting tab 44 of the bulkhead plate member 40 to secure the first end 45 of the bulkhead plate member 40 to the computer system housing 10, and the main portion 42 of the bulkhead plate member 40 in engagement (i.e., contact) with the EMI bulkhead gasket 26. The second mounting tab 46 of the bulkhead plate member 40 contacts the bulkhead wall 16 and is held in place by a screw fastener 63 that engages a slot 65 in the second mounting tab 46 and is threadably received in a hole 67 in the bulkhead wall 16. With the bulkhead plate member mounted to the computer system housing, the peripheral edge of the bulkhead plate member 40 is in contact with the bulkhead wall 16 and the EMI bulkhead gasket 26. As such EMI noise, such as may be produced by the PCB 54 and the RJ-45 connector 52, is conducted along the conductive path defined by the spring fingers 55, flange elements 48a–d of bulkhead plate member 40 and EMI bulkhead gasket 26 to the bulkhead wall 16 of computer system housing 10, thereby suppressing (i.e., attenuating) the EMI noise.

As seen best in FIG. 7, the opening 20 of the computer system housing 10 is closeable via a readily removable closure wall 80 that is releasably engageable with side walls 18 and the bulkhead wall 16. The closure wall 80 when removed from the computer system housing 10 provides access to the interior region 22 of the housing 10 so that bulkhead plate member 40 (i.e., PCB 54) can be inserted to and removed from the housing 10.

In this bulkhead plate member 40 and computer system housing 10 of the present invention, the flange elements 48a–d defining the opening 50 in the main portion 42 of the bulkhead plate member 40 provide an increased amount of surface area contact between the bulkhead plate member 40 and the spring fingers 55 on the side walls 53 of the RJ-45 telephone jack connector 52. This increased surface area contact substantially maximizes (when compared to prior art solutions) the attenuation of EMI noise around the RJ-45 connector 52.

Although the present invention has been described with reference to preferred embodiments, workers skilled in the art will recognize that changes may be made in form and detail without departing from the spirit and scope of the invention.

What is claimed is:

1. A bulkhead plate member for providing an attenuating barrier for electromagnetic interference (EMI) noise in a computer system housing, the bulkhead plate member comprising:
    a rectangular shaped main portion having a plurality of edge walls defining an opening for receiving a peripheral component connector affixed to a printed circuit board (PCB), wherein each of the plurality of edge walls is defined by a flange element that extends outwardly from and is substantially perpendicular to the main portion, wherein one flange element that defines one of the plurality of edge walls further defines a portion of a peripheral edge of the main portion of the bulkhead plate member, wherein each flange element is integral with the main portion of the bulkhead plate member such that the flange elements and the main portion are a one-piece construction, and wherein each flange element is adapted to contact a side wall of the peripheral component connector to provide contact regions between the flange elements and side walls of the peripheral component connector, the integral nature of the flange elements and main portion conducting EMI noise at the peripheral component connector in an uninterrupted manner from the flange elements and through the main portion of the bulkhead plate member, such that the EMI noise is ultimately conducted to a bulkhead wall of the computer system housing thereby suppressing the EMI noise.

2. The bulkhead plate member of claim 1 wherein the main portion is a single sheet metal piece, and wherein the flange elements are formed by folding portions of the single sheet metal piece.

3. The bulkhead plate member of claim 1 wherein each flange element is trapezoid shaped.

4. The bulkhead plate member of claim 1 wherein the main portion includes an inner surface and an outer surface, wherein the peripheral component connector extends through the opening from the inner surface to the outer surface, and wherein the peripheral component connector does not extend past the outer surface of the main portion so as to substantially prevent damage to the peripheral component connector.

5. The bulkhead plate member of claim 1, and further including:
    a first mounting tab at a first end of the main portion; and
    a second mounting tab at a second opposite end of the main portion, the second mounting tab extending at substantially a 90° angle with respect to the main portion.

6. The bulkhead plate member of claim 5 wherein the opening is defined by four flange elements.

7. The bulkhead plate member of claim 5 wherein the flange elements extend from the main portion in a direction substantially opposite to a direction of extension of the second mounting tab from the main portion.

8. The bulkhead plate member of claim 1 wherein the side walls of the peripheral component connector include spring fingers, and wherein the flange elements engage the spring fingers so that EMI noise is conducted through the spring fingers to the bulkhead plate member, at the flange elements of the opening, to the bulkhead wall of the computer system housing thereby suppressing the EMI noise.

9. The bulkhead plate member of claim 8 wherein the peripheral component connector is a telephone jack connector.

10. The bulkhead plate member of claim 9 wherein the telephone jack connector is a RJ-45 connector.

11. A computer system housing for providing an attenuating barrier for electromagnetic interference (EMI) noise, the computer system housing comprising:
    a backplane wall having a plurality of connectors for receiving printed circuit board's (PCB's);
    a bulkhead wall coupled to the backplane wall, the bulkhead wall defining a plurality of bulkhead slots through which peripheral component connectors of the PCB's can extend; and
    a plurality of bulkhead plate members, at least one of the bulkhead plate members including:
        a rectangular shaped main portion having a plurality of edge walls defining an opening for receiving a peripheral component connector affixed to a printed circuit board (PCB), wherein each of the plurality of edge walls is defined by a flange element that extends outwardly from and is substantially perpendicular to the main portion, wherein one flange element that defines one of the plurality of edge walls further defines a portion of a peripheral edge of the main portion of the bulkhead plate member, wherein each flange element is integral with the main portion of the at least one bulkhead plate member such that the flange elements and the main portion are a one-piece construction, and wherein each flange element is adapted to contact a side wall of the peripheral component connector to provide contact regions between the flange elements and side walls of the peripheral component connector, the integral nature of the flange elements and main portion conducting EMI noise at the peripheral component connector in an uninterrupted manner from the flange elements and through the main portion of the at least one bulkhead plate member, such that the EMI noise is ultimately conducted to the bulkhead wall of the computer system housing thereby suppressing the EMI noise.

12. The computer system housing of claim 11 wherein the main portion is a single sheet metal piece, and wherein the flange elements are formed by folding portions of the single sheet metal piece.

13. The computer system housing of claim 11 wherein each flange element is trapezoid shaped.

14. The computer system housing of claim 11 wherein the main portion of the at least one bulkhead plate member includes a printed circuit board (PCB).

15. The computer system housing of claim 11 wherein the main portion includes an inner surface and an outer surface, wherein the peripheral component connector extends through the opening from the inner surface to the outer surface, and wherein the peripheral component connector does not extend past the outer surface of the main portion so as to substantially prevent damage to the peripheral component connector.

16. The computer system housing of claim 11 wherein the at least one bulkhead plate member further includes:

a first mounting tab at a first end of the main portion; and a second mounting tab at a second opposite end of the main portion, the second mounting tab extending at substantially a 90° angle with respect to the main portion.

17. The computer system housing of claim 16 wherein the opening is defined by four flange elements.

18. The computer system housing of claim 16 wherein the flange elements extend from the main portion in a direction substantially opposite to a direction of extension of the second mounting tab from the main portion.

19. The computer system housing of claim 16 wherein the second mounting tab of each of the bulkhead plate members defines a slot that receives a fastener for securing the bulkhead plate members to the bulkhead wall.

20. The computer system housing of claim 11 wherein the side walls of the peripheral component connector include spring fingers, and wherein the flange elements engage the spring fingers so that EMI noise is conducted through the spring fingers to the at least one bulkhead plate member, at the flange elements of the opening, to the bulkhead wall of the computer system housing thereby suppressing the EMI noise.

21. The computer system housing of claim 20 wherein the peripheral component connector is a telephone jack connector.

22. The computer system housing of claim 21 wherein the telephone jack connector is a RJ-45 connector.

23. The computer system housing of claim 11 wherein the main portion of the at least one bulkhead plate member includes a printed circuit board (PCB) having a peripheral component connector that extends through the opening of the main portion and one of the bulkhead slots.

24. The computer system housing of claim 23, and further including:

a plurality of side walls coupled to the backplane wall, at least two of the plurality of side walls being coupled to the bulkhead wall; and a readily removable closure wall releasably engaging the side walls and the bulkhead wall, the closure wall when removed providing access to an interior region of the computer system housing so that bulkhead plate members and PCB's can be inserted to and removed from the interior region of the computer system housing.

25. The computer system housing of claim 23 wherein side walls of the peripheral component connector include spring fingers, and wherein the flange elements engage the spring fingers so that EMI noise is conducted through the spring fingers to the at least one bulkhead plate member, at the flange elements of the opening, to the bulkhead wall of the computer system housing thereby suppressing the EMI noise.

26. The computer system housing of claim 25 wherein the peripheral component connector is a telephone jack connector.

27. The computer system housing of claim 26 wherein the telephone jack connector is a RJ-45 connector.

\* \* \* \* \*